US009694638B2

(12) United States Patent
Arano et al.

(10) Patent No.: US 9,694,638 B2
(45) Date of Patent: Jul. 4, 2017

(54) SPRING RUBBER SEAT AND STRUT-TYPE SUSPENSION

(71) Applicant: KAYABA INDUSTRY CO., LTD., Tokyo (JP)

(72) Inventors: Makoto Arano, Gifu (JP); Takao Nagasawa, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/776,739

(22) PCT Filed: Mar. 13, 2014

(86) PCT No.: PCT/JP2014/056753
§ 371 (c)(1),
(2) Date: Sep. 14, 2015

(87) PCT Pub. No.: WO2014/148364
PCT Pub. Date: Sep. 25, 2014

(65) Prior Publication Data
US 2016/0031280 A1   Feb. 4, 2016

(30) Foreign Application Priority Data

Mar. 21, 2013   (JP) .................................. 2013-057462

(51) Int. Cl.
*B60G 15/00* (2006.01)
*B60G 11/22* (2006.01)
*B60G 11/16* (2006.01)
*F16F 1/12* (2006.01)
*B60G 15/06* (2006.01)

(52) U.S. Cl.
CPC .............. *B60G 11/22* (2013.01); *B60G 11/16* (2013.01); *B60G 15/063* (2013.01); *B60G 15/065* (2013.01); *B60G 15/066* (2013.01); *F16F 1/126* (2013.01); *B60G 2202/143* (2013.01); *B60G 2202/312* (2013.01); *B60G 2204/125* (2013.01); *B60G 2204/1242* (2013.01)

(58) Field of Classification Search
CPC .. B60G 15/062; B60G 15/063; B60G 15/066; B60G 15/07; B60G 11/22
USPC ................... 267/172, 179, 221; 280/124.155
See application file for complete search history.

(56) References Cited

U.S. PATENT DOCUMENTS 5,470,049 A * 11/1995 Wohler .................. B60G 11/16
  267/170
6,079,700 A *  6/2000 Solomond ............ B60G 15/063
  267/221

(Continued)

FOREIGN PATENT DOCUMENTS

JP   2001-248674 A   9/2001
JP   2003-118341 A   4/2003

(Continued)

*Primary Examiner* — Christopher Schwartz
(74) *Attorney, Agent, or Firm* — Rabin & Berdo, P.C.

(57) ABSTRACT

A spring rubber seat provided between a spring formed by winding a wire rod to elastically support a chassis and a spring seat where the spring is placed. The spring rubber seat includes an arc seat portion having a seat surface where the spring is seated; and a link portion that links one circumferential end with the other circumferential end of the seat portion to make the spring rubber seat in an annular shape.

16 Claims, 13 Drawing Sheets

(56) References Cited

U.S. PATENT DOCUMENTS

| | | | | |
|---|---|---|---|---|
| 6,273,407 B1 * | 8/2001 | Germano | ............ | B60G 13/005 |
| | | | | 267/172 |
| 2011/0266765 A1 * | 11/2011 | Nowak | ................. | B60G 11/16 |
| | | | | 280/124.154 |
| 2013/0147149 A1 * | 6/2013 | Baker | ................. | B60G 15/063 |
| | | | | 280/124.155 |
| 2014/0230222 A1 * | 8/2014 | Mizukoshi | ............. | F16F 1/122 |
| | | | | 29/428 |

FOREIGN PATENT DOCUMENTS

| | | |
|---|---|---|
| JP | 2005-155808 A | 6/2005 |
| JP | 2005-273679 A | 10/2005 |
| JP | 2009-264559 A | 11/2009 |
| JP | 2012-219825 A | 11/2012 |

\* cited by examiner

SPRING RUBBER SEAT AND STRUT-TYPE SUSPENSION

TECHNICAL FIELD

This invention relates to a spring rubber seat and a strut-type suspension.

BACKGROUND ART

In JP 2012-219825 A, there is discussed a vehicle suspension provided with a spring rubber seat formed of an elastic material such as rubber and interposed between a coil spring that elastically supports a chassis and a spring seat that supports the coil spring.

However, the spring rubber seat of the vehicle suspension discussed in JP 2012-219825 A is formed in an arc shape having an opening provided in a part thereof in a circumferential direction. For this reason, when the coil spring is compressed, and its outer diameter is widened, an outer diameter of the spring rubber seat may increase along with the coil spring, so that the opening may be widened, and the spring rubber seat may be disadvantageously dislocated from the spring seat.

SUMMARY OF INVENTION

In view of the aforementioned problems, it is therefore an object of this invention to provide a spring rubber seat that resistant to dislocation from the spring seat.

According to one aspect of the present invention, a spring rubber seat provided between a spring formed by winding a wire rod to elastically support a chassis and a spring seat where the spring is placed. The spring rubber seat includes an arc seat portion having a seat surface where the spring is seated, and a link portion that links one circumferential end with the other circumferential end of the seat portion to make the spring rubber seat in an annular shape.

DESCRIPTION OF EMBODIMENTS

A description will now be made for embodiments of this invention with reference to the accompanying drawings.

Figure 1:
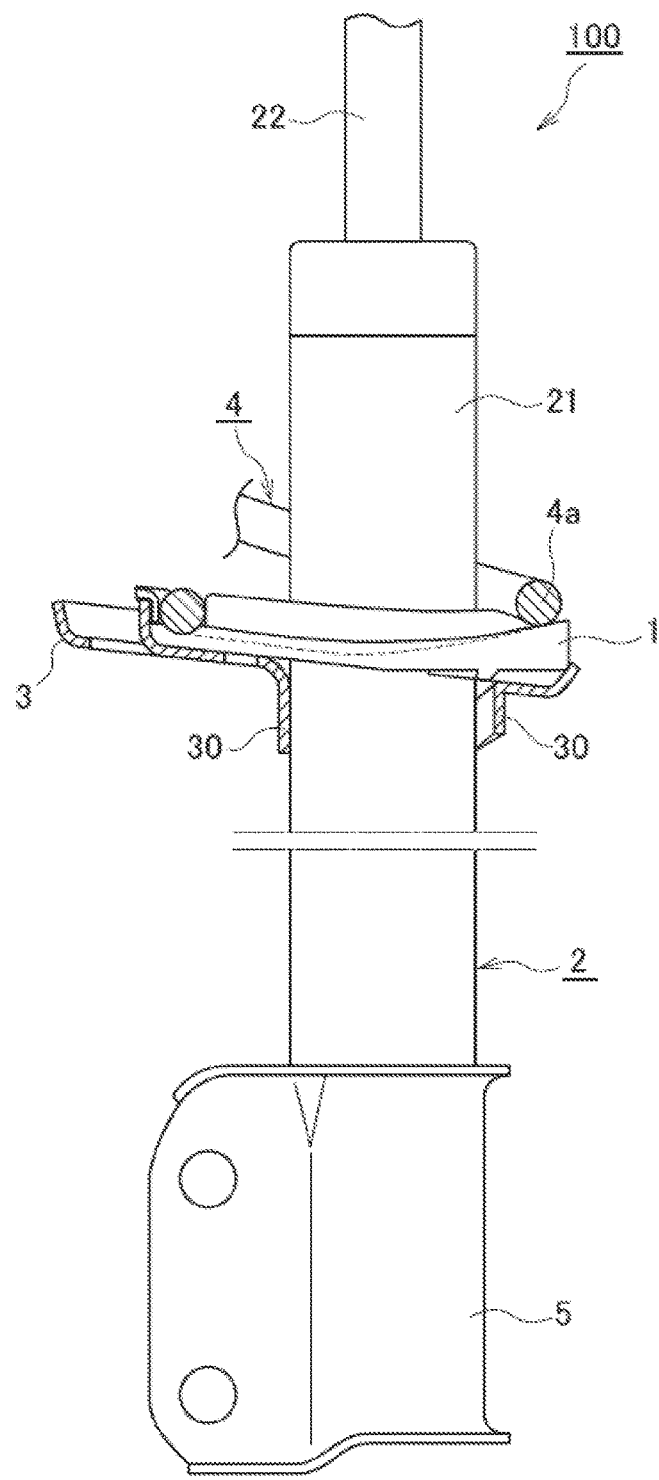
FIG. 1 is a front view illustrating a strut-type suspension having a spring rubber seat according to an embodiment of this invention.

FIG. 1 is a front view illustrating a strut-type suspension 100 having a spring rubber seat 1 according to an embodiment of this invention.

The strut-type suspension 100 is a device capable of absorbing impact or vibration received from a road surface during a vehicle travel to stably suspend a chassis. The strut-type suspension 100 has a shock absorber 2, a spring seat 3, a suspension spring 4, and a spring rubber seat 1.

The shock absorber 2 is a device that generates a damping force for suppressing vibration of the chassis. The shock absorber 2 has a cylindrical outer tube 21 and a piston rod 22 slidably inserted into the outer tube 21. The shock absorber 2 is interposed between the chassis and a wheel with a predetermined inclination. The shock absorber 2 is configured to generate a damping force when the piston rod 22 moves along an axial direction (upper and lower direction in FIG. 1) of the shock absorber 2 with respect to the outer tube 21. This damping force reduces vibration of a chassis within a short time.

The shock absorber 2 is an upright type shock absorber connected to the chassis with a chassis-side mount (not shown) fixed to one end side (upper side in FIG. 1) of the piston rod 22 and connected to a wheel side with a knuckle bracket 5 fixed to an outer circumference of one end side (lower side in FIG. 1) of the outer tube 21.

The spring seat 3 is a saucer-like member formed of metal (such as iron) and fixed to an outer circumference of the shock absorber 2 in an approximately axial center of the shock absorber 2. The spring seat 3 will be described below with reference to FIGS. 2 to 4 as well as FIG. 1.

Figure 2:
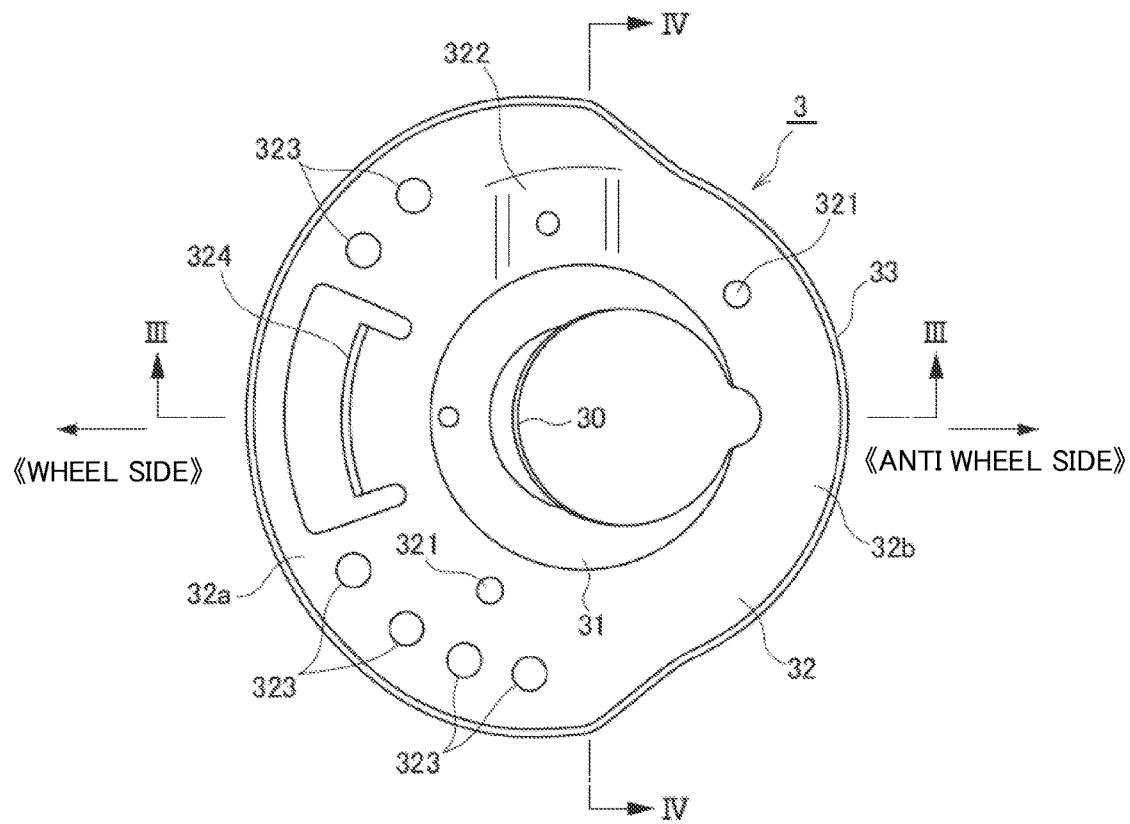
FIG. 2 is a top plan view illustrating a spring seat according to an embodiment of this invention.
Figure 3:
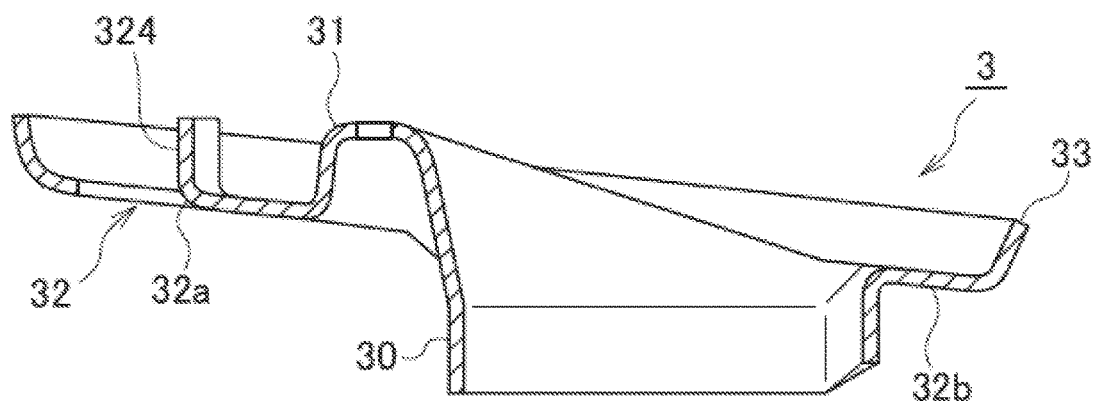
FIG. 3 is a cross-sectional view taken along the line III-III of FIG. 2.
Figure 4:
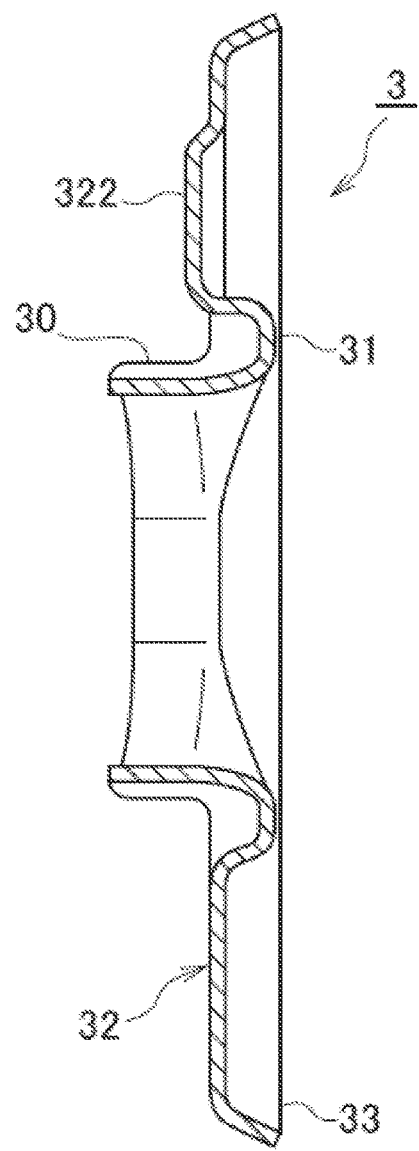
FIG. 4 is a cross-sectional view taken along the line IV-IV of FIG. 2.

FIG. 2 is a top plan view illustrating the spring seat 3. FIG. 3 is a cross-sectional view taken along the line III-III of FIG. 2. FIG. 4 is a cross-sectional view taken along the line IV-IV of FIG. 2.

As illustrated in FIGS. 1 to 4, the spring seat 3 has an opening 30, a protrusion 31, a catch tray 32, and a support wall 33.

As illustrated in FIGS. 1 to 4, the opening 30 is a ring-shaped portion having a predetermined length in an axial direction of the shock absorber 2. As illustrated in FIG. 2, the opening 30 is formed in a position decentered from the center of the spring seat 3 oppositely to the wheel side as seen from the shock absorber 2 when the spring seat 3 is fixed to an outer circumference of the shock absorber 2. As the opening 30 is fixed to the outer circumference of the shock absorber 2 through welding, the spring seat 3 is fixed to the outer circumference of the shock absorber 2.

As illustrated in FIG. 2, the protrusion 31 is a crescent portion formed in the wheel side as seen in a plan view from the shock absorber 2 when the spring seat 3 is fixed to the outer circumference of the shock absorber 2. As illustrated in FIG. 3, the protrusion 31 extends from the opening 30 toward the wheel side generally in a radial direction of the shock absorber 2 so as to protrude upward in an axial direction of the shock absorber 2.

As illustrated in FIG. 2, the catch tray 32 is a flat portion extending from the opening 30 and the protrusion 31 toward the shock absorber 2 in a radial direction. The suspension spring 4 is placed on the catch tray 32 by interposing the spring rubber seat 1. The catch tray 32 is formed such that a radial length of the wheel-side portion 32a formed in the wheel side is longer than a radial length of the anti-wheel-side portion 32b formed oppositely to the wheel side. As illustrated in FIG. 3, the catch tray 32 is slightly inclined downward in an axial direction of the shock absorber 2 from the wheel-side portion 32a to the anti-wheel-side portion 32b.

As illustrated in FIG. 2, a pair of through-holes 321 formed to penetrate through the catch tray 32 symmetrically with respect to the opening 30 and a hollow 322 extending in a radial direction are provided radially inside of the catch tray 32. Radially outside of the catch tray 32, and in the wheel side, a plurality of lightening holes 323 are formed along a circumferential direction of the shock absorber 2, and a support piece 324 is formed by erecting a part of the catch tray 32 oppositely to the support wall 33 described below.

As illustrated in FIGS. 1 to 4, the support wall 33 is an approximately ring-shaped outer wall formed by erecting an outer edge of the catch tray 32 upward in an axial direction of the shock absorber 2.

A description will be made for a strut-type suspension 100 by returning to FIG. 1.

The suspension spring 4 elastically supports a chassis to absorb impact caused by an uneven road surface and received by a wheel. The suspension spring 4 is placed on the catch tray 32 of the spring seat 3 by interposing the spring rubber seat 1. The suspension spring 4 is, for example, a coil spring formed by helically winding a wire rod 4a formed of metal such as iron.

The shock absorber 2 of the strut-type suspension 100 receives a bending moment at all times. For this reason, in order to reduce the bending moment, the suspension spring 4 is configured such that rigidity of its wheel-side portion is higher than that of its anti-wheel-side portion when the suspension spring 4 is interposed between the chassis-side mount and the spring seat 3.

As a result, a reactive force is stronger in the wheel-side portion of the suspension spring 4 even when a compression amount of the wheel-side portion is equal to that of the anti-wheel-side portion. For this reason, it is possible to reduce a bending moment applied to the shock absorber 2 by using the reactive force of the suspension spring 4 even when an inclination angle of the catch tray 32 of the spring seat 3 is reduced to be nearly horizontal.

The spring rubber seat 1 is formed of an elastic material such as rubber and is interposed between the spring seat 3 and the suspension spring 4.

Both the spring seat 3 and the suspension spring 4 are formed of metal. Therefore, if the suspension spring 4 is directly placed on the catch tray 32 of the spring seat 3, the spring seat 3 or the suspension spring 4 may be damaged by, for example, a foreign object such as dirt, dust, and mud introduced into a gap between the spring seat 3 and the suspension spring 4, so that the spring seat 3 or the suspension spring 4 may be rusted and deteriorated.

As the suspension spring 4 expands or contracts, its outer diameter is narrowed or widened. For this reason, as the suspension spring 4 expands or contracts, the spring seat 3 and the suspension spring 4 may make friction with each other to generate noise, or the spring seat 3 or the suspension spring 4 may be damaged and rusted, so that they may be disadvantageously deteriorated.

In this regard, according to this embodiment, a spring rubber seat 1 formed of an elastic material is provided between the metal spring seat 3 and the metal suspension spring 4 in order to suppress such deterioration or noise in the spring seat 3 and the suspension spring 4.

In this case, depending on a shape of the spring rubber seat 1 or the spring seat 3, a shape of the spring rubber seat 1 is deformed along with the suspension spring 4 when the suspension spring 4 expands or contracts to change its outer diameter, so that the spring rubber seat 1 may be disadvantageously dislocated from the spring seat 3.

According to this embodiment, the inclination angle of the catch tray 32 of the spring seat 3 is set to be nearly horizontal as described above. Therefore, a radial force (lateral force) received by the spring rubber seat 1 from the suspension spring 4 as the suspension spring 4 is compressed increases, compared to a case where the inclination angle is given. For this reason, the spring rubber seat 1 may be dislocated from the spring seat 3 by this lateral force as well.

In this regard, according to this embodiment, the spring rubber seat 1 is shaped resistant to dislocation from the spring seat 3 as illustrated in FIGS. 5 to 13.

A description will now be made for the shape of the spring rubber seat 1 according to this embodiment in more detail with reference to FIGS. 5 to 13.

First, the description will be made for appearance of the spring rubber seat 1 with reference to FIGS. 5 to 11.

Figure 5:
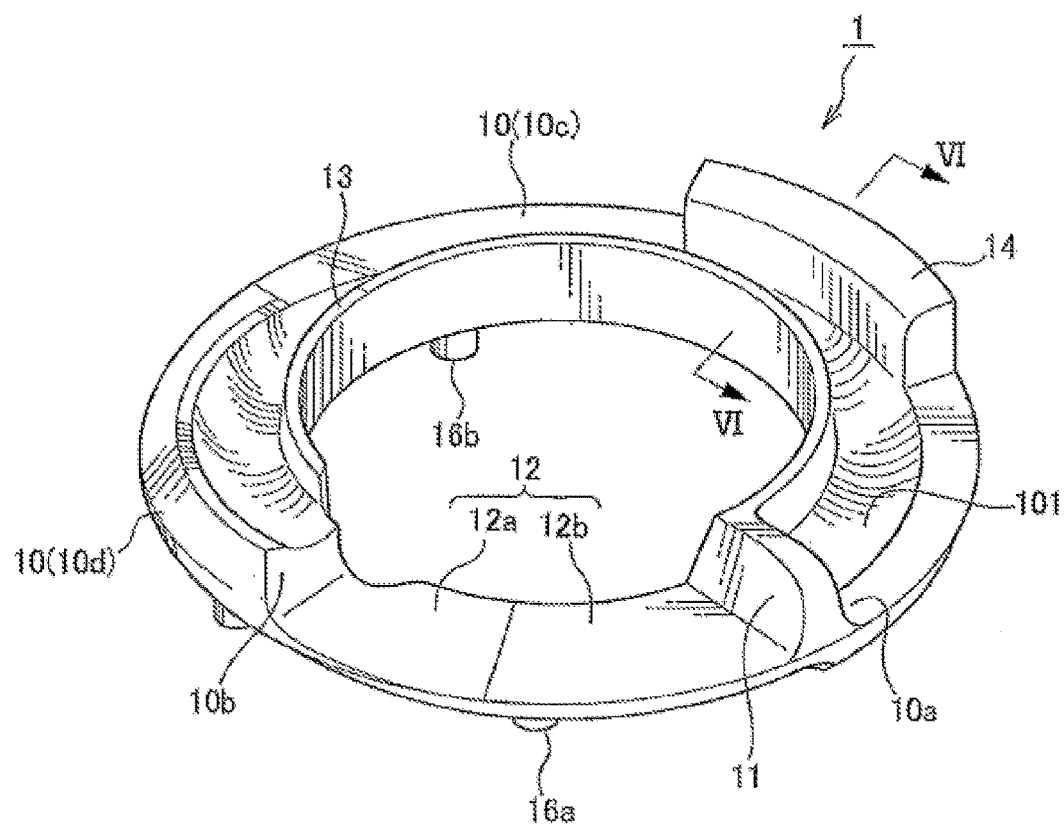
FIG. 5 is a perspective view illustrating a spring rubber seat according to an embodiment of this invention.
Figure 6:
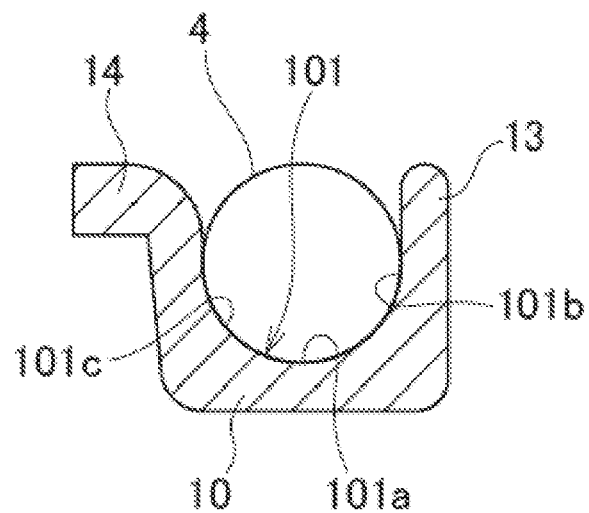
FIG. 6 is a cross-sectional view taken along the line VI-VI of FIGS. 5 and 7.
Figure 7:
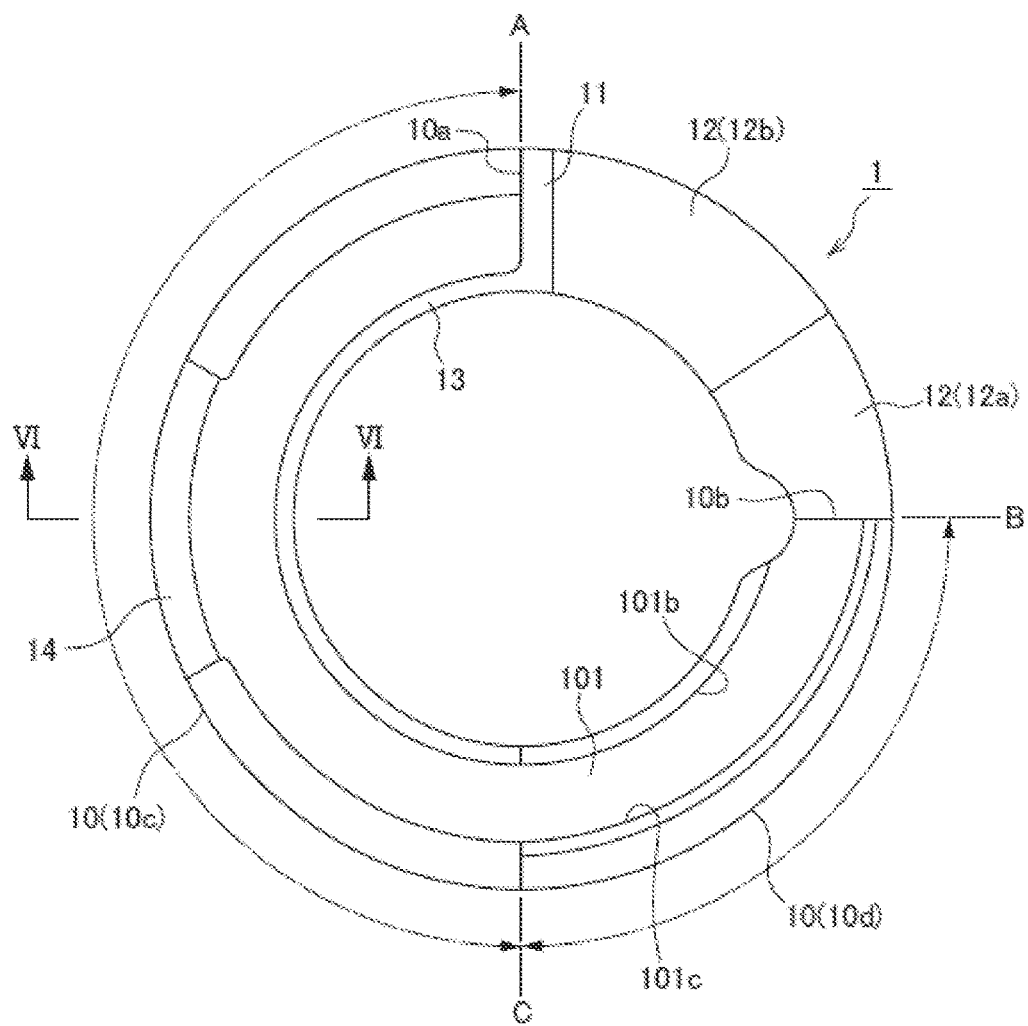
FIG. 7 is a top plan view illustrating a spring rubber seat according to an embodiment of this invention.
Figure 8:
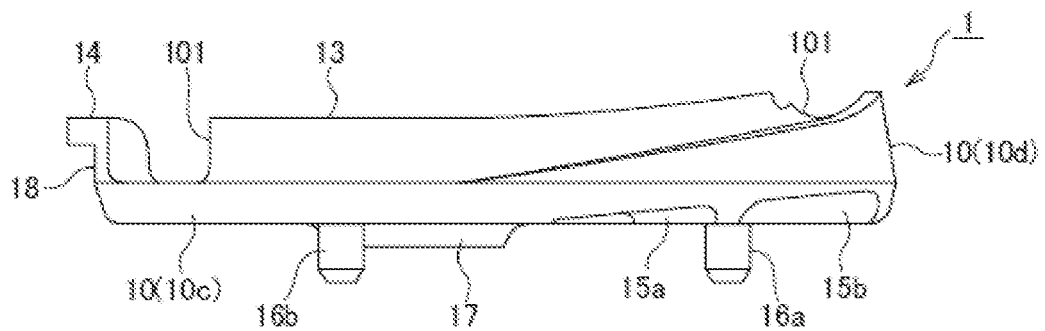
FIG. 8 is a front view illustrating a spring rubber seat according to an embodiment of this invention.
Figure 9:
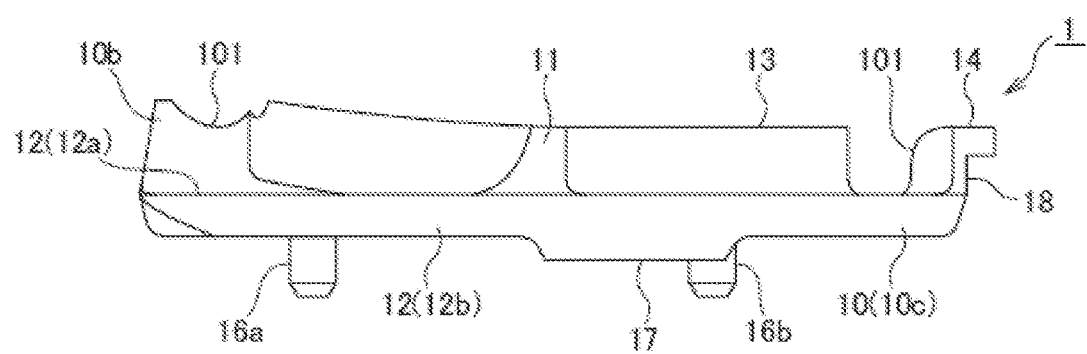
FIG. 9 is a rear view illustrating a spring rubber seat according to an embodiment of this invention.
Figure 10:
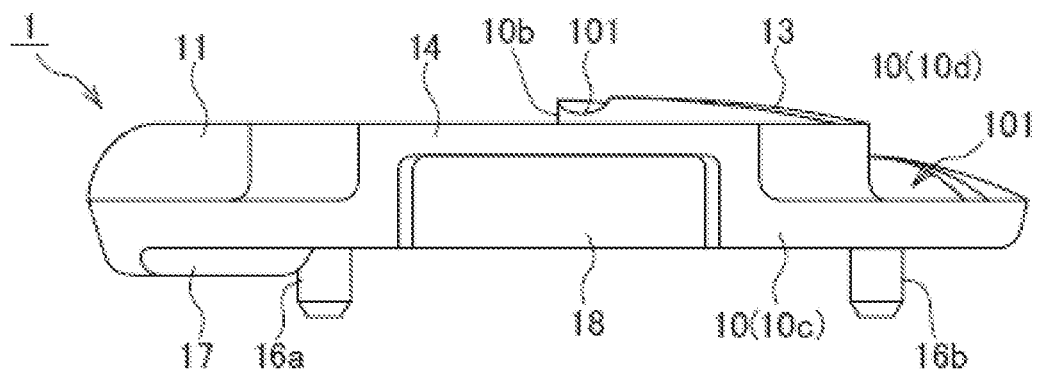
FIG. 10 is a left side view illustrating a spring rubber seat according to an embodiment of this invention.
Figure 11:
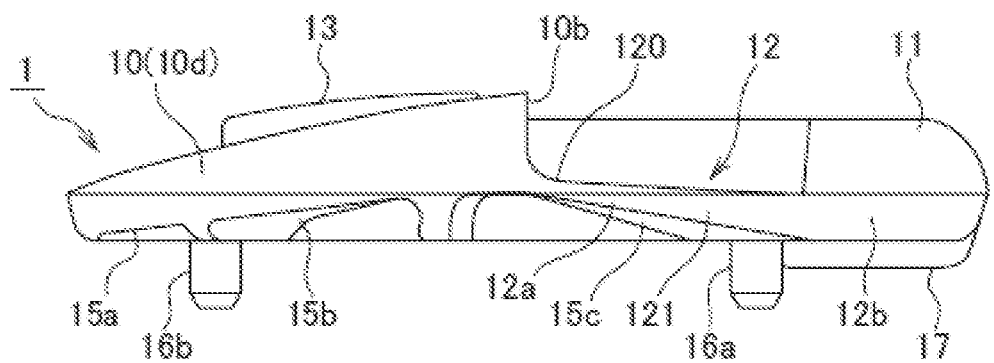
FIG. 11 is a right side view illustrating a spring rubber seat according to an embodiment of this invention.

FIG. 5 is a perspective view illustrating the spring rubber seat 1. FIG. 6 is a cross-sectional view taken along the line VI-VI of FIGS. 5 and 7. FIG. 7 is a top plan view illustrating the spring rubber seat 1. FIG. 8 is a front view illustrating the spring rubber seat. FIG. 9 is a rear view illustrating the spring rubber seat 1. FIG. 10 is a left side view illustrating the spring rubber seat 1. FIG. 11 is a right side view illustrating the spring rubber seat 1.

As illustrated in FIG. 5, the spring rubber seat 1 is a ring-shaped component formed of an elastic material such as rubber in an integrated manner. The spring rubber seat 1 includes a seat portion 10, a stopper 11, a link portion 12, a rib 13, and a guide 14. The spring rubber seat 1 is fitted to an outer circumference of the protrusion 31 of the spring seat 3 of FIG. 2 and is loaded on the catch tray 32.

The seat portion 10 is an arc portion having a seat surface 101 where the suspension spring 4 is seated.

The seat surface 101 is a trench formed on a surface of the seat portion 10. As illustrated in FIG. 6, a radial cross section of the seat surface 101 is curved to match the cross-sectional shape of the wire rod 4a of the suspension spring 4, and inner and outer circumferential edges 101b and 101c of the seat surface 101 are formed to be higher than the deepest portion 101a of the seat surface 101. As a result, a foreign object such as sand is not easily introduced into a gap between the seat surface 101 and the suspension spring 4 (wire rod 4a).

The stopper 11 is formed in one end 10a of the arc seat portion 10. The stopper 11 is a wall formed to protrude from the surface of the seat portion 10 in parallel with the radial direction of the spring rubber seat 1. As a leading end of the wire rod 4a of the suspension spring 4 abuts on the stopper 11, the movement of the suspension spring 4 is restricted.

The link portion 12 is a portion for linking one end 10a with the other end 10b of the seat portion 10 formed in an arc shape to make the spring rubber seat 1 in a ring shape. As described below, the link portion 12 includes first and second link portions 12a and 12b.

The rib 13 is a wall formed by erecting an inner edge of the seat portion 10 in an upright manner. The rib 13 suppresses the suspension spring 4 from being dislocated from the seat surface 101 as the suspension spring 4 expands, and its outer diameter is narrowed.

The guide 14 is a wall formed by erecting a part of the outer edge of the seat portion 10 in an upright manner. As illustrated in FIGS. 8 to 10, an engagement trench 18 for fitting the guide 14 into the support piece 324 of the spring seat 3 is formed on the back side of the guide 14. The guide 14 suppresses the suspension spring 4 from being dislocated from the seat surface 101 when the suspension spring 4 is compressed and its outer diameter is widened. In addition, the guide 14 is fitted to the support piece 324 of the spring seat 3 so as to suppress the spring rubber seat 1 from being rotated circumferentially on the spring seat 3.

FIG. 7 is a top plan view illustrating the spring rubber seat 1. As illustrated in FIG. 7, if one end 10a of the seat portion 10 provided with the stopper 11 is assumed as a start point A of the spring rubber seat 1, the seat portion 10 is formed to extend from the start point A to approximately 270° counterclockwise (A-B range) in FIG. 7.

A thickness of the seat portion 10 is constant until 180° counterclockwise from the start point A (A-C range). A height from the spring seat 3 of the seat surface 101 formed on the A-C range in the seat portion 10 is constant.

Meanwhile, a thickness of the seat portion 10 in the remaining range (C-B range) other than the A-C range gradually increases toward the other end 10b of the seat portion 10. That is, a height from the spring seat 3 of the seat surface 101 formed on the C-B range in the seat portion 10 increases toward the other end 10b of the seat portion 10. In other words, the seat surface 101 formed on the C-B range in the seat portion 10 has a slope.

In this manner, if the seat surface 101 is inclined to match the inclination of the wire rod 4a of the suspension spring 4, it is possible to prevent the suspension spring 4 from being separated from the seat surface 101 even when the suspension spring 4 expands or contracts.

In the following description, the A-C range having no slope on the seat surface 101 out of the seat portion 10 will be referred to as a "non-sloped portion 10c," and the C-B range having a slope will be referred to as a "sloped portion 10d." It is noted that how to set the ranges of the non-sloped portion 10c and the sloped portion 10d may be suitably selected without limiting to this. However, the seat surface 101 is inclined along the wire rod 4a of the suspension spring 4, and the suspension spring 4 is not separated from the seat surface 101 even when the suspension spring 4 expands or contracts.

Next, a description will be made for a shape of the back side of the spring rubber seat 1 (the side adjoining with the spring seat 3) with reference to FIGS. 12 and 13.

Figure 12:
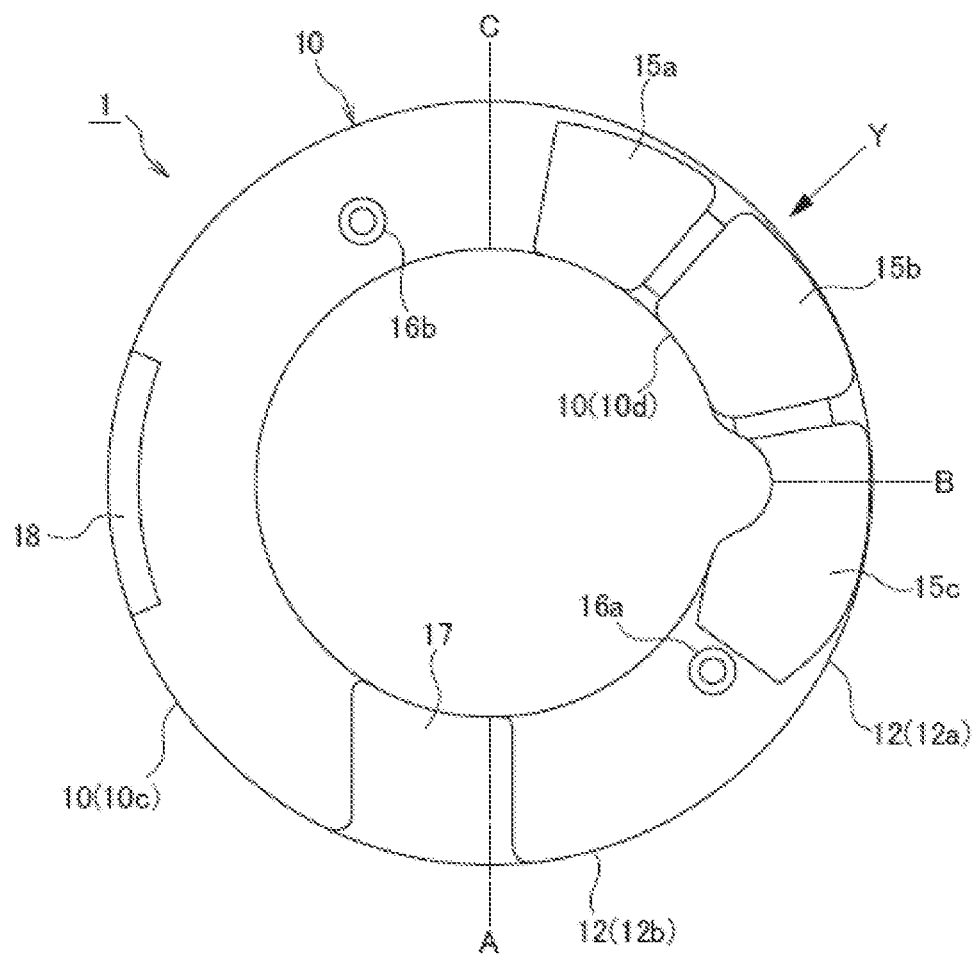
FIG. 12 is a back view illustrating a spring rubber seat according to an embodiment of this invention.

FIG. 12 is a back view illustrating the spring rubber seat 1. FIG. 13 is an enlarged view as seen from the arrow direction Y of FIG. 12.

As the suspension spring 4 is compressed, the spring rubber seat 1 is elastically deformed to press down the seat surface 101. In this case, the inclination angle of the wire rod 4a of the suspension spring 4 decreases (to be nearly horizontal). However, the other end 10b side of the seat portion, that is, the sloped portion 10d side is thickened in order to slope the seat surface 101. Therefore, rigidity increases here stronger than the non-sloped portion 10c if there is no change. If the rigidity is stronger in the other end 10b side of the seat portion 10, it is difficult to press down the seat surface 101 when the suspension spring 4 is compressed. As a result, since it is difficult to reduce the inclination angle of the wire rod 4a of the suspension spring 4, a reactive force characteristic of the suspension spring 4 changes.

In this regard, according to this embodiment, three trenches 15a, 15b, and 15c extending in a radial direction of the spring rubber seat 1 are formed side by side along the circumferential direction of the spring rubber seat 1 in the back side of the spring rubber seat 1 as illustrated in FIG. 12.

Out of three trenches, a pair of the trenches 15a and 15b are provided in the sloped portion 10d, and the remaining single trench 15c is provided to traverse the sloped portion 10d and the link portion 12. As a result, it is possible to reduce the rigidity of the thickened sloped portion 10d compared to the non-sloped portion 10c. In addition, a gap is formed between the sloped portion 10d and the catch tray 32.

For this reason, it is possible to easily elastically deform the periphery of the other end 10b side of the seat portion 10 as the suspension spring 4 is compressed. Therefore, it is possible to suppress a change of the reactive force characteristic of the suspension spring 4.

Meanwhile, since there is no trench in the non-sloped portion 10c, no gap is formed between the non-sloped portion 10c and the catch tray 32. It is noted that the number, the locations, and the shapes of the trenches 15a, 15b, and 15c for forming a gap between the spring rubber seat 1 and the catch tray 32 may suitably change without limiting thereto.

In the following description, a portion of the link portion 12 connected to the other end 10b of the seat portion 10 and provided with the trench 15c on the back side to form a gap with the catch tray 32 will be referred to as a "first link portion 12a." Meanwhile, a portion of the link portion 12 extending from the first link portion 12a to the stopper 11 and abutting on the catch tray 32 will be referred to as a "second link portion 12b."

Figure 13:
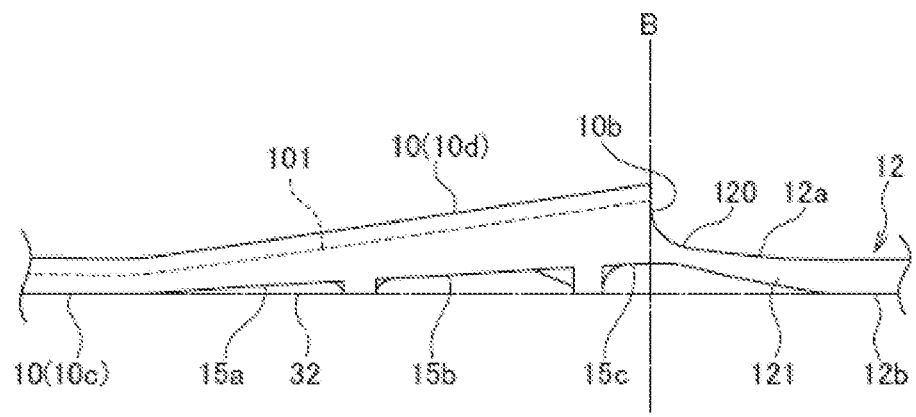
FIG. 13 is an enlarged view as seen from the arrow direction Y of FIG. 12.

As illustrated in FIG. 13, a thickness of the first link portion 12a is thinnest in a portion close to the other end 10b of the seat portion 10 (hereinafter, referred to as a "thinnest portion" 120). In addition, a thickness of the first link portion 12a gradually increases from the thinnest portion 120 to the other end 10b side of the seat portion 10. Similarly, the thickness gradually increases from the thinnest portion 120 to the second link portion 12b. Meanwhile, a thickness of the second link portion 12b is constant and matches the thickness of the end of the second link portion 12b side of the first link portion 12a.

As a result, it is possible to lower the rigidity in a portion ranging from the thinnest portion 120 of the first link portion 12a to the end of the second link portion 12b side (hereinafter, referred to as an "elastically deformable portion 121") than the rigidity of the second link portion 12b, even when the spring rubber seat 1 is formed of a single type of material in an integrated manner. For this reason, compared to the second link portion 12b, the elastically deformable portion 121 of the first link portion 12a is more easily elastically deformable.

Since a distance from the thinnest portion 120 to a boundary between the first and second link portions 12a and 12b is longer than a distance from the thinnest portion 120 to the other end 10b of the seat portion 10, it is possible to form the elastically deformable portion 121 sufficiently.

Since the spring rubber seat 1 has the first link portion 12a having the elastically deformable portion 121 having rigidity lower than that of the second link portion 12b, it is possible to obtain the following effects.

As described above, as the suspension spring 4 is compressed, the spring rubber seat 1 is elastically deformed to press down the seat surface 101. In this case, a deformation amount is largest in the other end 10b of the seat portion 10 where the height of the seat surface 101 is highest. According to this embodiment, since the trench 15c is formed in the back side of the other end 10b of the seat portion 10, the pressing amount increases compared to a case where there is no trench 15c. For this reason, in particular, the seat surface 101 on the other end 10b of the seat portion 10, that is, a terminated end of the seat surface 101 vertically moves severely as the suspension spring 4 expands or contracts.

In this regard, if the elastically deformable portion 121 having rigidity lower than that of the second link portion 12b is formed in the first link portion 12a according to this embodiment, the elastically deformable portion 121 having lower rigidity works first earlier than the second link portion 12b to absorb a vertical motion even when the other end 10b side of the seat portion 10 is elastically deformed severely by expansion or contraction of the suspension spring 4, and the terminated end of the seat surface 101 vertically moves severely. For this reason, it is possible to suppress the vertical motion of the seat surface 101 from being transmitted to the second link portion 12b.

It is noted that, although the rigidity of the elastically deformable portion 121 is reduced to be lower than that of the second link portion 12b by reducing the thickness according to this embodiment, how to reduce the rigidity may be suitably selected without limiting thereto. For example, the elastically deformable portion 121 may be formed of a material having rigidity lower than that of the second link portion 12b. Alternatively, a hole vertically penetrating though the elastically deformable portion 121 may be provided in the elastically deformable portion 121.

As illustrated in FIG. 12, a projection 16a inserted into one of a pair of through-holes 321 of the spring seat 3 is formed in the center of the back side of the link portion 12. Similarly, a projection 16b inserted into the other through-hole 321 of the spring seat 3 is formed in the center of the back side of the seat portion 10. According to this embodiment, these projections 16a and 16b also suppress the spring rubber seat 1 from being rotated in a circumferential direction on the spring seat 3.

It is noted that the projections 16a and 16b are provided in the second link portion 12b and the non-sloped portion 10c, respectively. In these portions, the deformation amount of the spring rubber seat 1 is insignificant even when the suspension spring 4 expands or contracts. Therefore, it is possible to reduce the load applied to the projections 16a and 16b.

As illustrated in FIG. 9, a deck 17 inserted from the second link portion 12b into the trench of the spring seat 3 across the non-sloped portion 10c of the seat portion 10 is formed in the back side of the spring rubber seat 1. For this reason, using the deck 17, it is also possible to suppress the spring rubber seat 1 from being rotated in a circumferential direction on the spring seat 3.

A description will now be made for the effects of the spring rubber seat 1 according to this embodiment.

The spring rubber seat 1 according to this embodiment is formed by winding the wire rod 4a and is interposed between the suspension spring 4 that elastically supports a chassis and the spring seat 3 where the suspension spring 4 is placed. In addition, the spring rubber seat 1 has the arc seat portion 10 provided with the seat surface 101 where the suspension spring 4 is seated. The spring rubber seat 1 has the link portion 12 that links one circumferential end 10a with the other circumferential end 10b of the seat portion 10 to make the spring rubber seat 1 in an annular shape.

In this manner, the spring rubber seat 1 according to this embodiment is formed in an annular shape by linking both ends of the arc seat portion 10 with the link portion 12 to be continuous over the entire circumference. Therefore, it is possible to suppress the shape of the spring rubber seat 1 from being deformed along with the suspension spring 4 when the outer diameter of the suspension spring 4 changes. Therefore, it is possible to prevent the spring rubber seat 1 from being easily dislocated from the spring seat 3.

The link portion 12 of the spring rubber seat 1 according to this embodiment includes the first link portion 12a connected to the other end 10b of the seat portion 10 and includes the second link portion 12b connected to the first link portion 12a and one end 10a of the seat portion 10. In addition, the rigidity of the first link portion 12a is lower than the rigidity of the second link portion 12b and the rigidity of the second link portion 12b.

For this reason, even when the terminated end of the seat surface 101 in the other end 10b side of the seat portion 10 vertically moves severely as the suspension spring 4 expands or contracts, the first link portion 12a having lower rigidity absorbs this vertical motion, so that it is possible to suppress the vertical motion from being transmitted to the second link portion 12b. Therefore, since it is possible to suppress the second link portion 12b adjoining with the spring seat 3 from floating from the spring seat 3, it is possible to prevent the spring rubber seat 1 from being easily dislocated from the spring seat 3.

In this case, according to this embodiment, the thickness of the first link portion 12a is thinner than the thickness of the second link portion 12b. Therefore, the rigidity of the first link portion 12a is lower than that of the second link portion 12b.

As a result, it is possible to form the spring rubber seat 1 by using an elastic material such as rubber in an integrated manner. In addition, it is possible to set the rigidity of the first link portion 12a to be lower than that of the second link portion 12b even when the first and second link portions 12a and 12b are formed of the same material. For this reason, it is possible to easily form the spring rubber seat 1.

The first link portion 12a of the spring rubber seat 1 according to this embodiment has the thinnest portion 120 where the thickness is thinnest. In addition, the thickness of the first link portion 12a gradually increases from the thinnest portion 120 to the other end 10b of the seat portion 10. Similarly, the thickness of the first link portion 12a gradually increases from the thinnest portion 120 to the second link portion 12b.

As a result, it is possible to set the rigidity in a portion of the first link portion 12a from the thinnest portion 120 to the second link portion 12b (elastically deformable portion 121) to be lower than that of the second link portion 12b. Therefore, it is possible to set the rigidity of the first link portion 12a to be lower than that of the second link portion 12b. In addition, it is possible to suppress the spring rubber seat 1 from being broken in a boundary between the seat portion 10 and the elastically deformable portion 121 due to a load applied to the spring rubber seat 1 even when the thickness of the other end 10b of the seat portion 10 is different from the thickness of the elastically deformable portion 121.

In this case, according to this embodiment, a distance from the thinnest portion 120 to the boundary between the first and second link portions 12a and 12b is longer than a distance from the thinnest portion 120 to the other end 10b of the seat portion 10.

As the distance from the thinnest portion 120 to the boundary between the first and second link portions 12a and 12b is set to be longer than the distance from the thinnest portion 120 to the other end 10b of the seat portion 10, it is possible to form the elastically deformable portion 121 sufficiently. Therefore, it is possible to further suppress the vertical motion described above from being transmitted to the second link portion 12b.

According to this embodiment, the spring rubber seat 1 has the projection 16a formed in the back side of the second link portion 12b and inserted into the hole of the spring seat 3.

The second link portion 12b is a portion less elastically deformed out of the spring rubber seat 1 when the suspension spring 4 expands or contracts. In this manner, the projection 16a is provided in the back side of the second link portion 12b by avoiding the other end 10b of the seat portion 10 where elastic deformation is most significant as the suspension spring 4 expands or contracts. Therefore, it is possible to reduce the load applied to the projection 16a and suppress the projection 16a from being deteriorated.

Since the link portion 12 is not directly pressed by the suspension spring 4 to the spring seat 3, it is conceived that the link portion 12 may be easily dislocated from the hole of the spring seat 3 if a projection is formed in the back side of the second link portion 12b. However, according to this embodiment, a vertical motion of the other end of the seat portion 10 is not easily transmitted to the second link portion 12b. Therefore, it is possible to suppress the projection of the back side of the second link portion 12b from being dislocated from the hole of the spring seat 3.

The seat portion 10 of the spring rubber seat 1 according to this embodiment has a non-sloped portion 10c having no slope on the seat surface 101 and a sloped portion 10d having a slope on the seat surface 101. The non-sloped portion 10c is formed to extend from one end 10a of the seat portion 10 to a predetermined circumferential position C of the seat portion 10. The sloped portion 10d is formed to extend from the predetermined position C to the other end 10b of the seat portion 10, and the height of the seat surface 101 of the sloped portion 10d is formed to be increased toward the other end 10b of the seat portion 10 to be higher than the height of the seat surface 101 of the non-sloped portion 10c to match the shape of the suspension spring 4.

According to this embodiment, in order to form a gap between the spring seat 3 and the back side of the sloped portion 10d, the trenches 15a, 15b, and 15c extending in a radial direction of the spring rubber seat 1 are formed in the back side of the sloped portion 10d.

As the suspension spring 4 is compressed, the spring rubber seat 1 is elastically deformed to press down the seat surface 101. In this case, the inclination angle of the wire rod 4a of the suspension spring 4 decreases (to be nearly horizontal). However, if rigidity of the other end 10b side of the seat portion 10 is higher, the seat surface 101 is not easily pressed down as the suspension spring 4 is compressed. As a result, the inclination angle of the wire rod 4a of the suspension spring 4 is not easily reduced, so that a reactive force characteristic of the suspension spring 4 changes.

In this regard, if the trenches 15a, 15b, and 15c are provided in the back side of the sloped portion 10d according to this embodiment, it is possible to reduce the rigidity of the sloped portion 10d to easily generate elastic deformation. Therefore, it is possible to suppress a change of the reactive force characteristic of the suspension spring 4.

The spring rubber seat 1 according to this embodiment has the projection 16b formed in the back side of the non-sloped portion 10c and inserted into the hole of the spring seat 3.

Similar to the second link portion 12b, the non-sloped portion 10c is a portion less elastically deformable out of the spring rubber seat 1 as the suspension spring 4 is expanded or compressed. In this manner, if the projection 16b is provided in the back side of the non-sloped portion 10c by avoiding the other end 10b of the seat portion 10 where elastic deformation is most easily generated as the suspension spring 4 is expanded or compressed, it is possible to reduce the load applied to the projection 16b and suppress deterioration of the projection 16b.

A radial cross-sectional shape of the spring rubber seat 1 on the seat surface 101 of the spring rubber seat 1 according to this embodiment is curved to match the cross-sectional shape of the wire rod 4a of the suspension spring 4. The inner and outer circumferential edges 101b and 101c of the seat surface 101 are configured to be higher than the deepest portion 101a of the seat surface 101.

For this reason, it is possible to prevent a foreign object such as sand, dirt, and mud from being easily introduced into a gap between the seat surface 101 and the wire rod 4a of the suspension spring 4. Therefore, it is possible to more reliably suppress a damage of the suspension spring 4.

Furthermore, the spring rubber seat 1 according to this embodiment is interposed between the spring seat 3 and the suspension spring 4 of the strut-type suspension 100.

In some cases of the strut-type suspension 100, the spring rubber seat 1 may receive a lateral force depending on a requirement of the suspension spring 4. For this reason, if the spring rubber seat 1 is formed in an annular shape according to this embodiment, it is possible to suppress deformation of the shape of the spring rubber seat 1 when it receives a lateral force. Therefore, it is possible to prevent the spring rubber seat 1 from being easily dislocated from the spring seat 3.

In this manner, in the strut-type suspension 100, the spring rubber seat 1 is easily dislocated from the spring seat 3 by a lateral force. For this reason, if the spring rubber seat 1 according to this embodiment is employed in the strut-type suspension 100, it is possible to more effectively suppress the spring rubber seat 1 from being dislocated from the spring seat 3.

Although the embodiment of the present invention has been described above, the above embodiment is merely an illustration of one application example of the present invention and not of the nature to limit the technical scope of the present invention to the specific configuration of the above embodiment.

Although the spring rubber seat 1 according to this embodiment is employed in the strut-type suspension 100, it may be employed in any other types of suspensions. In addition, the configuration of the shock absorber 2 or the suspension spring 4 are not limited to those described above. Instead, if the suspension spring 4 is compressed equally between the chassis side and the anti-chassis side, a typical coil spring exerting the same reactive force between the chassis side and the anti-chassis side may also be employed.

Furthermore, the shape or the configuration of the spring rubber seat 1 is not particularly limited to those of the embodiments described above, and may also be suitably modified as long as it is formed in an annular shape.

The present application claims a priority of Japanese Patent Application No. 2013-57462 filed with the Japan Patent Office on Mar. 21, 2013, and all the contents of which are hereby incorporated by reference.

The invention claimed is:

1. A spring rubber seat configured to fit between a spring formed of a wound wire rod to elastically support a chassis and a lower spring seat having a flat catch tray, the spring rubber seat configured to fit along the catch tray, comprising:
   a seat portion having an arc shape and having a seat surface where the spring is seated; and
   a link portion that links one circumferential end with the other circumferential end of the seat portion to make the spring rubber seat in an annular shape,
   wherein the link portion has
      a first link portion connected to the other end of the seat portion, and
      a second link portion connected to the first link portion and one end of the seat portion, and
   the first link portion has rigidity lower than that of the second link portion.

2. The spring rubber seat according to claim 1, wherein the rigidity of the first link portion is set to be lower than that of the second link portion by forming the first link portion to be thinner than the second link portion.

3. The spring rubber seat according to claim 2, wherein the first link portion has a thinnest portion, and
   the first link portion has a thickness increasing from the thinnest portion to the other end of the seat portion, the thickness increasing from the thinnest portion to the second link portion.

4. The spring rubber seat according to claim 3, wherein a distance from the thinnest portion to a boundary between the first and second link portions is longer than a distance from the thinnest portion to the other end of the seat portion.

5. The spring rubber seat according to claim 1, wherein the seat portion has
   a non-sloped portion having no slope on the seat surface, and
   a sloped portion having a slope on the seat surface,
   the non-sloped portion is formed to extend from one end of the seat portion to a predetermined circumferential position of the seat portion,
   the sloped portion is formed to extend from the predetermined position to the other end of the seat portion, and
   the seat surface of the sloped portion has a height increasing toward the other end of the seat portion to be higher than a height of the seat surface of the non-sloped portion to match a shape of the spring.

6. The spring rubber seat according to claim 5, further comprising a trench provided in the back side of the sloped portion to extend along a radial direction of the spring rubber seat in order to form a gap between the spring seat and the back side of the sloped portion.

7. The spring rubber seat according to claim 5, wherein the spring rubber seat has a projection formed in the back side of the non-sloped portion, the projection being inserted into a hole of the spring seat.

8. The spring rubber seat according to claim 1, wherein the spring rubber seat has a projection formed in a back side of the second link portion, the projection being inserted into a hole of the spring seat.

9. The spring rubber seat according to claim 1, wherein a radial cross-sectional shape of the seat surface in the spring rubber seat is curved to match a cross-sectional shape of the wire rod of the spring, and
   inner and outer circumferential edges of the seat surface are formed to be higher than a deepest portion of the seat surface.

10. The spring rubber seat according to claim 1, wherein one end of the seat portion is provided with a stopper protruding upward from the seat surface, the stopper abutting on a leading end of the wire rod of the spring.

11. A strut-type suspension comprising:
   the spring rubber seat according to claim 1; and
   a shock absorber interposed between the chassis and a wheel, the shock absorber being provided with a cylindrical outer tube and a piston rod slidably inserted into the outer tube,
   wherein the spring seat is fixed to an outer circumference of the outer tube to with radially protruding from the outer tube, and
   the spring rubber seat is interposed between the spring and the spring seat.

12. The spring rubber seat according to claim 1, wherein the link portion has
   a first link portion connected to a terminated end of the seat portion, and
   a second link portion connected to the first link portion and one end of the seat portion serving as a start point, and
   the first link portion has rigidity lower than that of the second link portion.

13. The spring rubber seat according to claim 1, wherein the catch tray of the spring seat is formed so as to be nearly horizontally in a state that a strut-type suspension provided with the spring seat is mounted on a vehicle.

14. A spring rubber seat configured to fit between a spring formed of a wound wire rod to elastically support a chassis and a lower spring seat having a flat catch tray, the spring rubber seat configured to fit along the catch tray, comprising:
   a seat portion having an arc shape and having a seat surface where the spring is seated; and
   a link portion that links one circumferential end with the other circumferential end of the seat portion to make the spring rubber seat in an annular shape,
   wherein one end of the seat portion is provided with a stopper protruding upward from the seat surface, the stopper abutting on a leading end of the wire rod of the spring, and
   the link portion is thinner than the other circumferential end of the seat portion and thinner than the stopper.

15. The spring rubber seat according to claim 14, wherein the catch tray of the spring seat is formed so as to be nearly horizontally in a state that a strut-type suspension provided with the spring seat is mounted on a vehicle.

16. The spring rubber seat according to claim 14, wherein the link portion has
   a first link portion connected to a terminated end of the seat portion, and
   a second link portion connected to the first link portion and one end of the seat portion serving as a start point, and
   the first link portion has rigidity lower than that of the second link portion.

* * * * *